United States Patent
Morisse

(10) Patent No.: US 10,719,384 B2
(45) Date of Patent: Jul. 21, 2020

(54) DETERMINING RELATIONSHIPS BETWEEN COMPONENTS IN A COMPUTING ENVIRONMENT TO FACILITATE ROOT-CAUSE ANALYSIS

(71) Applicant: Red Hat, Inc., Raleigh, NC (US)

(72) Inventor: Erich S. Morisse, New York, NY (US)

(73) Assignee: Red Hat, Inc., Raleigh, NC (US)

( * ) Notice: Subject to any disclaimer, the term of this patent is extended or adjusted under 35 U.S.C. 154(b) by 164 days.

(21) Appl. No.: 15/902,696

(22) Filed: Feb. 22, 2018

(65) Prior Publication Data

US 2019/0258535 A1 Aug. 22, 2019

(51) Int. Cl.
*G06F 11/00* (2006.01)
*G06F 11/07* (2006.01)
*G06F 11/34* (2006.01)
*G06F 40/205* (2020.01)

(52) U.S. Cl.
CPC ........ *G06F 11/079* (2013.01); *G06F 11/0709* (2013.01); *G06F 11/0766* (2013.01); *G06F 11/0772* (2013.01); *G06F 11/0778* (2013.01); *G06F 11/0787* (2013.01); *G06F 11/0793* (2013.01); *G06F 11/3476* (2013.01); *G06F 40/205* (2020.01)

(58) Field of Classification Search
CPC ............... G06F 11/0709; G06F 11/079; G06F 11/0787; G06F 11/0793; G06F 11/0772; G06F 11/0766
See application file for complete search history.

(56) References Cited

U.S. PATENT DOCUMENTS

| 5,559,958 | A | * | 9/1996 | Farrand ............... G06F 11/0709 |
| | | | | 709/223 |
| 8,230,259 | B2 | | 7/2012 | Fernandess et al. |
| 8,260,751 | B2 | | 9/2012 | Johnson et al. |

(Continued)

OTHER PUBLICATIONS

Author Unknown, "Monitoring Windows Event Logs—A Tutorial," ManageEngine, OpManager, available at least as early as Jan. 2, 2018, 7 pages, https://www.manageengine.com/network-monitoring/Eventlog_Tutorial_Part_I.html.

(Continued)

*Primary Examiner* — Charles Ehne
(74) *Attorney, Agent, or Firm* — Withrow & Terranova, PLLC

(57) ABSTRACT

Determining relationships between components in a computing environment to facilitate root-cause analysis is disclosed. A logfile comprising a plurality of logfile records that were originated by a plurality of components is accessed. The logfile records identify a time associated with the logfile record and a component of the plurality of components that originated the logfile record. Each respective logfile record is parsed to identify the time associated with the logfile record and the component that originated the logfile record. A plurality of respective time window records is generated based on the at least some of the plurality of logfile records. Each respective time window record identifies the components that originated the logfile records during a time window that corresponds to the respective time window record. A directed graph that identifies dependencies among the plurality of components is generated based on the plurality of time window records.

21 Claims, 7 Drawing Sheets

(56) References Cited

U.S. PATENT DOCUMENTS

| | | | |
|---|---|---|---|
| 9,122,602 B1 | 9/2015 | Jewell et al. | |
| 9,367,380 B2 | 6/2016 | Bennah et al. | |
| 2004/0054776 A1* | 3/2004 | Klotz | H04L 41/06 |
| | | | 709/224 |
| 2004/0153863 A1* | 8/2004 | Klotz | H04L 41/12 |
| | | | 714/45 |
| 2016/0094422 A1* | 3/2016 | Poola | H04L 43/067 |
| | | | 709/224 |
| 2016/0224402 A1 | 8/2016 | Togawa | |
| 2017/0091008 A1* | 3/2017 | Cherbakov | G06F 11/079 |
| 2017/0364402 A1 | 12/2017 | Chua et al. | |
| 2019/0042675 A1* | 2/2019 | Martin | G05B 23/0283 |

OTHER PUBLICATIONS

Lou, Jian-Guang et al., "Mining Dependency in Distributed Systems through Unstructured Logs Analysis," SIGOPS Operating System Review, 2010, 6 pages, http://citeseerx.ist.psu.edu/viewdoc/download?doi=10.1.1.580.129&rep=rep1&type=pdf.
Hamed, "Bayesian network in R: Introduction," R-bloggers, Feb. 15, 2015, 5 pages, https://www.r-bloggers.com/bayesian-network-in-r-introduction/.

* cited by examiner

DETERMINING RELATIONSHIPS BETWEEN COMPONENTS IN A COMPUTING ENVIRONMENT TO FACILITATE ROOT-CAUSE ANALYSIS

TECHNICAL FIELD

The examples relate generally to determining a cause of a fault or other problem in a complex computing environment, and in particular to determining relationships between components in a computing environment to facilitate root-cause analysis.

BACKGROUND

Today's computing environments, such as desktop, laptop, or server computing devices, and smartphone and computing tablet computing devices, contain multiple levels of complex software packages layered on top of one another or that operate in parallel with one another in ways that may be unknown to a user or operator. The software packages may be made up of hundreds or thousands of components, including sub-components, that each implement a certain functionality or responsibility and that have both intra-package component dependencies as well as inter-package component dependencies. At times, a fault or other problem occurs in such an environment, and it is desirable to determine the component or components responsible for the fault.

SUMMARY

The examples disclosed herein identify components in a computing environment, and relationships between the components to facilitate, for example, root-cause analysis of problems.

In one example a method is provided. The method includes accessing a logfile comprising a plurality of logfile records that were originated by a plurality of components. At least some of the plurality of logfile records identify a time associated with the logfile record and a component of the plurality of components that originated the logfile record. The method further includes parsing each respective logfile record of the at least some of the plurality of logfile records to identify the time associated with the logfile record and the component that originated the logfile record. The method further includes generating, based on the at least some of the plurality of logfile records, a plurality of respective time window records. Each respective time window record identifies the components that originated the logfile records during a time window that corresponds to the respective time window record. The method further includes generating, based on the plurality of time window records, a directed graph that identifies dependencies among the plurality of components.

In another example, a computing device is provided. The computing device includes a memory and a processor device. The processor device is coupled to the memory and is to access a logfile comprising a plurality of logfile records that were originated by a plurality of components. At least some of the plurality of logfile records identify a time associated with the logfile record and a component of the plurality of components that originated the logfile record. The processor device is further to parse each respective logfile record of the at least some of the plurality of logfile records to identify the time associated with the logfile record and the component that originated the logfile record. The processor device is further to generate, based on the at least some of the plurality of logfile records, a plurality of respective time window records. Each respective time window record identifies the components that originated the logfile records during a time window that corresponds to the respective time window record. The processor device is further to generate, based on the plurality of time window records, a directed graph that identifies dependencies among the plurality of components.

In another example a computer program product stored on a non-transitory computer-readable storage medium is provided. The computer program product includes instructions to cause a processor device to access a logfile comprising a plurality of logfile records that were originated by a plurality of components. At least some of the plurality of logfile records identify a time associated with the logfile record and a component of the plurality of components that originated the logfile record. The instructions further cause the processor device to parse each respective logfile record of the at least some of the plurality of logfile records to identify the time associated with the logfile record and the component that originated the logfile record. The instructions further cause the processor device to generate, based on the at least some of the plurality of logfile records, a plurality of respective time window records. Each respective time window record identifies the components that originated the logfile records during a time window that corresponds to the respective time window record. The instructions further cause the processor device to generate, based on the plurality of time window records, a directed graph that identifies dependencies among the plurality of components.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
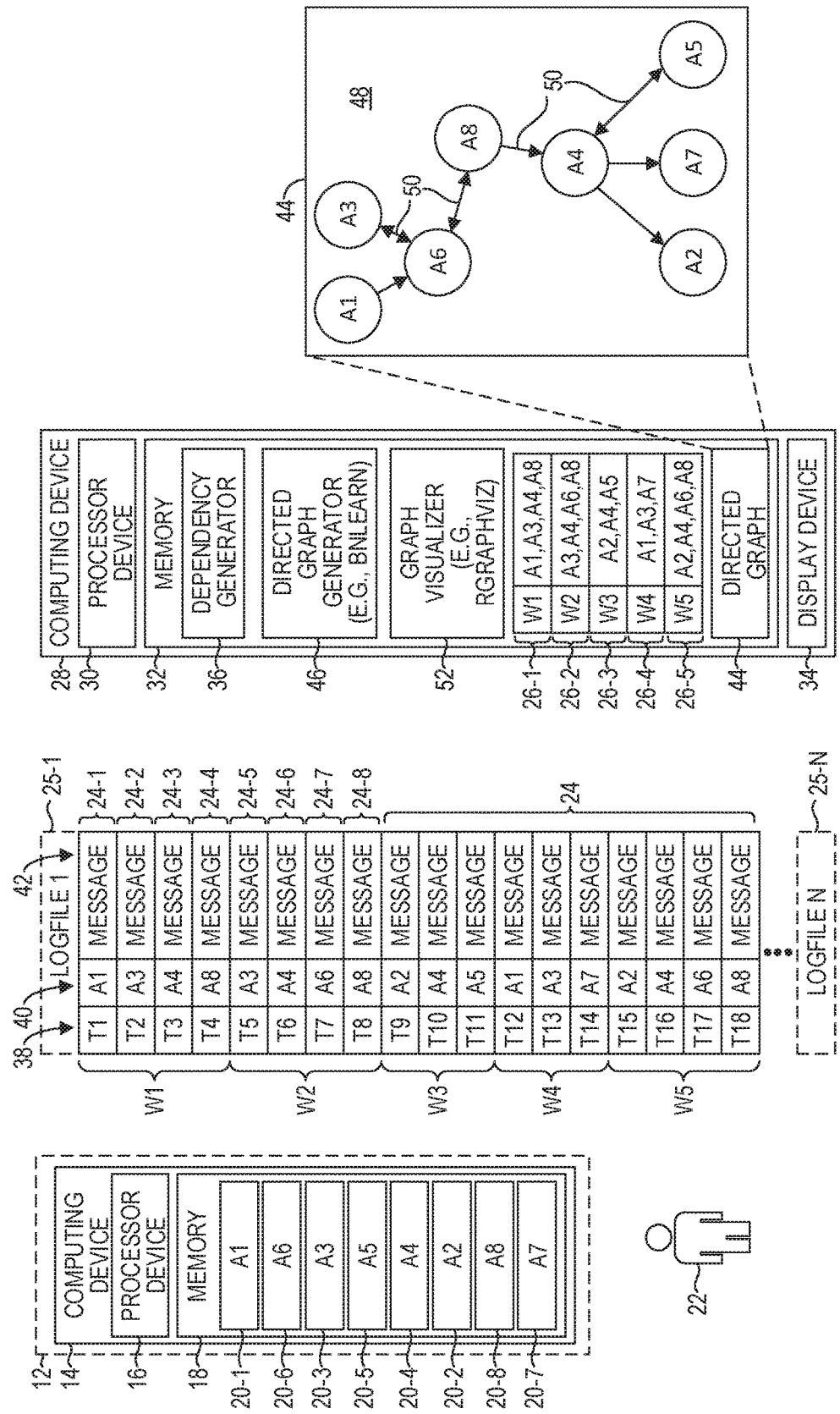
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first logfile" and "second logfile," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Today's computing environments, such as desktop, laptop, or server computing devices, smart phones and computing tablet computing devices, and the like, contain multiple levels of complex software packages layered on top of one another or that operate in parallel with one another in ways that may be unknown to a user or operator. The software packages may be made up of hundreds or thousands of components, including sub-components, that each implement a certain functionality or responsibility and that have both intra-package dependencies as well as inter-package dependencies. At times, a problem, such as a fault or warning, occurs in such an environment, and it is desirable to determine the component or components responsible for the problem.

The individual attempting to "debug" the problem is in essence attempting to find a root cause of the problem such that a solution can then be devised. However, it is rare that the individual is knowledgeable about the architecture of each software package in a computing environment, or could be aware of the many, many intra-package component dependencies as well as inter-package component dependencies between software packages used in the computing environment. The user is not only unlikely to know dependencies between components, but is even unlikely to know what the components are.

Many components have the capability of logging information during execution. Logfile records from multiple components may be written to multiple logfiles, or may be consolidated by a logging mechanism into one or a relatively small number of logfiles. The examples disclosed herein analyze logfile records stored in one or more logfiles to determine the components and the dependencies between components that generate logfile records. The examples generate a directed graph that can be visually presented to a user to visually depict and identify both the components and the dependencies between the components. The user can utilize the visual depiction of the directed graph to learn about the components executing at the time the problem occurred and to learn about the dependencies between such components.

In some examples disclosed herein, a Bayesian network is generated based on the logfile records. The Bayesian network comprises a directed acyclic graph with probability information that identifies a probability that a child component generated a logfile record given the existence of logfile records from one or more parent components.

Among other advantages, the examples facilitate an improved dependency generator computing device that can determine, and identify, complex inter-package and intra-package component dependencies executing in a complex software environment. The examples reduce the need for highly trained and skilled people to identify a root cause of a problem, making the resolution of problems both less expensive, and more timely.

The examples also facilitate an improvement to computer functionality itself via the generation of a novel directed graph structure that identifies what were previously unknown components, as well as unknown relationships between components. Thus, the examples are directed to specific improvements in computer functionality.

FIG. 1 is a block diagram of an environment 10 in which examples may be practiced. The environment 10 includes a computing environment 12 that, solely for purposes of illustration, includes a single computing device 14. However, the examples have applicability to computing environments 12 that include multiple different computing devices. The computing device 14 includes a processor device 16 and a memory 18. The memory 18 includes a plurality of components 20-1-20-8 (generally, components 20. The phrase "component" as used herein refers to a software process that is capable of being independently identified as the subject component of a logfile record. The subject component is identified in the logfile record such that the logfile record contains a message about the subject component. The subject component itself may have generated the logfile record, or another component may have generated the logfile record and identified the subject component in the logfile record. The subject component of a logfile record will be referred to herein as an originator of the logfile record, or, as the component that originated the logfile record.

While for purposes of illustration only eight components 20 are illustrated, a computing environment 12 may involve hundreds or thousands of different components. The components 20 may be contained in different software packages from different software vendors. Some of the components 20 may be subcomponents of other components 20. The components 20 have relationships with one another, such as, by way of non-limiting example, one component 20 may invoke another component 20, one component 20 may necessarily execute before or after another component 20, or one component 20 may rely on the output of another component 20 to perform its respective function. A user 22 of the computing environment 12 may be completely unaware of what components 20 are executing in the computing environment 12, and/or completely unaware of the dependencies and/or relationships between all or some of the components 20.

Over a period of time, the components 20 generate a plurality of logfile records 24, 24-1-24-8, that are stored in a logfile 25-1 of a plurality of different logfiles 25-1-25-N. The components 20 may directly store the logfile records 24 in the logfile 25-1, or may store, send or otherwise communicate the logfile records 24 to one or more intermediaries that ultimately consolidate the logfile records 24 in the logfile 25-1.

The environment 10 also includes a computing device 28 that has a processor device 30 and a memory 32. The computing device 28 may also be coupled to or have an integral display device 34. In one example, the memory 32 includes a dependency generator 36 that implements some or all of the functionality disclosed herein. It will be noted that because the dependency generator 36 is a component of the computing device 28, functionality implemented by the dependency generator 36 may be attributed herein to the computing device 28 generally. Moreover, in examples such as shown in FIG. 1 where the dependency generator 36 comprises software instructions that program the processor device 30 to carry out functionality discussed herein, functionality implemented by the dependency generator 36 may be attributed herein to the processor device 30.

Assume that the computing device 14 experiences a problem, such as a fault, a warning message, or an inability to perform an action that the computing device 14 is expected to do. The dependency generator 36 accesses, such as by reading, the logfile 25-1. The dependency generator 36 parses each respective logfile record 24 to identify the time associated with the logfile record 24 and the component 20 that originated the logfile record 24. In particular, the dependency generator 36 may utilize string parsing techniques that match predetermined patterns in the logfile records 24 to separate portions of the logfile records 24, such as a time component portion 38 that identifies the time associated with the respective logfile record 24, a component portion 40 that identifies the component that originated the respective logfile record 24 (i.e., is the subject of the respective logfile record 24) and a message portion 42 that contains information, typically textual, about the respective logfile record 24.

The dependency generator 36 determines a time span of a plurality of time windows W1-W5. The length of the time span for each time window W1-W5 is typically the same. In some examples, the length of the time span may be user-configurable. In other examples, the dependency generator 36 may analyze the logfile 25-1 and determine a suitable time span based on the overall time span of the logfile records 24 in the logfile 25-1, the number of logfile records 24 in the logfile 25-1, or a combination of the time span of the logfile records 24 in the logfile 25-1 and the number of logfile records 24 in the logfile 25-1. While the time span can be any length of time, in some examples it is a time span between about 1 second and 60 seconds. In other examples it is a time span between about 1 minute and 60 minutes.

The dependency generator 36 generates, based on the plurality of logfile records 24, a plurality of respective time window records 26-1-26-5 (generally, time window records 26), each respective time window record 26 identifying the components 20 that originated the logfile records 24 during a particular time window having a time span of the determined length of time.

As an example, assume that the determined time span is five seconds. The dependency generator 36 identifies the time window W1 as covering a five-second time span, and, based on the time component portion 38 of the logfile records 24, identifies the logfile records 24-1-24-4 as the logfile records generated during that five-second time span. Based on the component portion 40 of the logfile records 24-1-24-4, the dependency generator 36 generates the time window record 26-1, which identifies the components 20-1 (A1), 20-3 (A3), 20-4 (A4), and 20-8 (A8) as the components 20 that originated the logfile records during the time window W1.

The dependency generator 36 identifies the time window W2 as covering a different five second time span than that of the time window W1. The time window W2 may be the next successive five seconds after the time window W1, or may capture a non-successive five second time span if, for example, no logfile records 24 were generated in the five seconds that occurred after the time window W1. The dependency generator 36, based on the time component portion 38 of the logfile records 24, identifies the logfile records 24-5-24-8 as the logfile records generated during that five second time span. Based on the component portion 40 of the logfile records 24-5-24-8, the dependency generator 36 generates the time window record 26-2, which identifies the components 20-3 (A3), 20-4 (A4), 20-6 (A6), and 20-8 (A8) as the components 20 that originated the logfile records during the time window W2. The dependency generator 36, in a similar manner, generates the time window records 26-3-26-5 based on the time windows W3-W5, respectively.

The dependency generator 36 generates, based on the plurality of time window records 26-1-26-5, a directed graph 44 that identifies dependencies among the plurality of components 20. In one example, the dependency generator 36 generates the directed graph 44 by utilizing a directed graph generator 46 such as may be provided by a graph-generating package, such as, by way of non-limiting example, a BNlearn graph-generating package, available at www.bnlearn.com. However, the examples herein can utilize any directed graph generator. The dependency generator 36 may then output the directed graph 44 for presentation on the display device 34. In some examples, the dependency generator 36 generates an image 48 that identifies each component 20, and identifies dependencies between the components 20 via lines 50 that connect pairs of the components 20. The lines 50 may include arrowheads to show dependencies from one component 20 to another component 20. The image 48 thus visually depicts to the user 22 not only the components 20 that were executing on the computing device 14 at the time of the problem, which may have been unknown to the user 22, but also relationships between the components 20. As an example, if the user 22 is aware that the problem occurred in the component 20-4, based on the image 48, the user 22 may initially perform an analysis on the component 20-8 or the components 20-2, 20-7, and 20-5 to ascertain whether such components lead to the problem in the component 20-4.

In some examples, the dependency generator 36 may generate the image 48 by utilizing a graph visualizer 52, such as, by way of non-limiting example, a Rgraphviz graph visualizer, available at www.bioconductor.org, although the examples are not limited to any particular graph visualizer.

Figure 2:
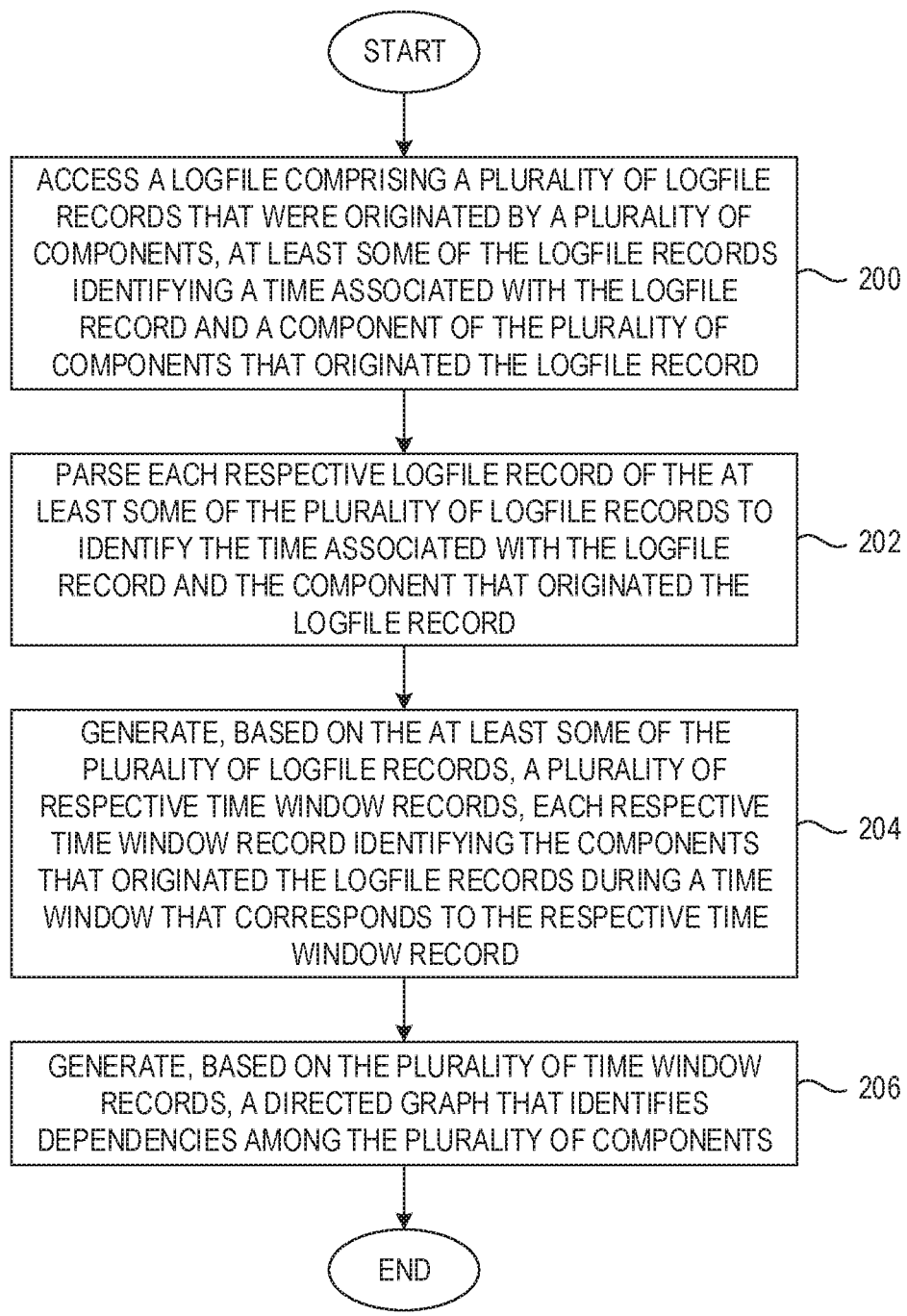
FIG. 2 is a flowchart illustrating a method for determining relationships between components in a computing environment to facilitate root-cause analysis according to one example.

FIG. 2 is a flowchart illustrating a method for determining relationships between the components 20 in the computing environment 12 to facilitate root-cause analysis according to one example. FIG. 2 will be discussed in conjunction with FIG. 1. The dependency generator 36 accesses the logfile 25-1 comprising the plurality of logfile records 24 that were originated by the plurality of components 20. At least some of the plurality of logfile records 24 identify a time associated with the logfile record 24 and the component 20 of the plurality of components 20 that originated the logfile record 24 (FIG. 2, block 200).

The dependency generator 36 parses each respective logfile record 24 to identify the time associated with the logfile record 24 and the component 20 that originated the logfile record 24 (FIG. 2, block 202). The dependency generator 36 generates, based on the plurality of logfile records 24, a plurality of respective time window records 26, each respective time window record 26 identifying the components 20 that originated the logfile records 24 during a time window W that corresponds to the respective time window record 26 (FIG. 2, block 204). The dependency generator 36 generates, based on the plurality of time window records 26, the directed graph 44 that identifies dependencies between the plurality of components 20.

Figure 3:
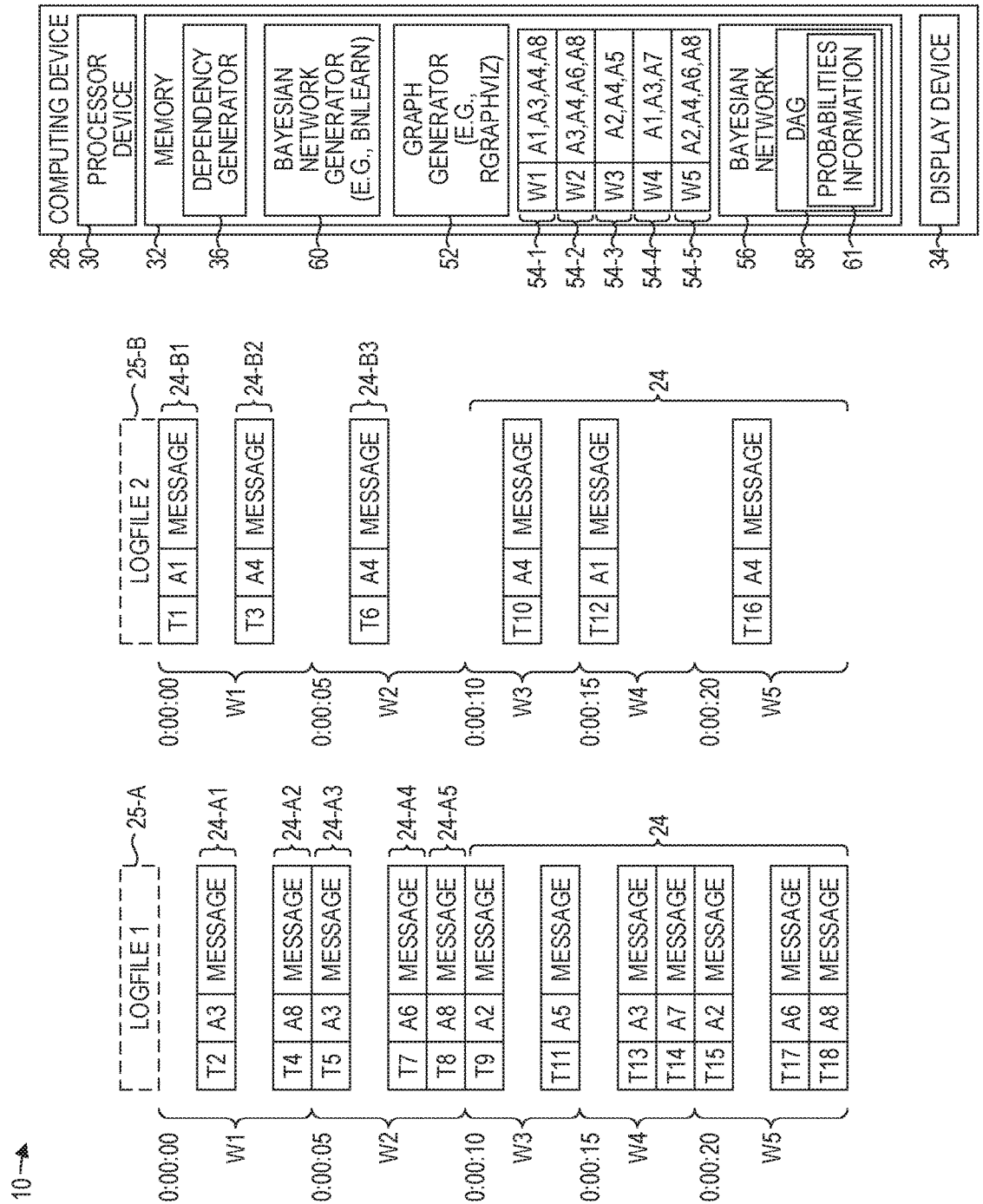
FIG. 3 is a block diagram of the environment illustrated in FIG. 1, illustrating the use of multiple logfiles according to one example.

FIG. 3 is a block diagram of the environment 10 illustrating the use of multiple logfiles 25 according to one example. In this example, a plurality of logfile records 24, 24-A1-24-A5, 24-B1-24-B3 are spread among a first logfile 25-A and a second logfile 25-B. In this example, logfile records 24 generated by the components 20-2, 20-3, 20-5, 20-6, 20-7, and 20-8 were written to the logfile 25-A, and logfile records generated by the components 20-1 and 20-4 were written to the logfile 25-B. The dependency generator 36 determines a time span of a plurality of time windows W1-W5. In this example, it will be assumed that the time span is five seconds. Time window W1 covers the time from 0:00:00 (midnight) to 0:00:05 in both the logfiles 25-A and 25-B. Thus, the logfile records 24-A1, 24-A2, 24-B1, and 24-B2 were generated within the same time window W1. The dependency generator 36, based on the logfile records 24-A1, 24-A2, 24-B1, and 24-B2 in the logfiles 25-A and 25-B, generates a time window record 54-1 which identifies the components 20-1 (A1), 20-3 (A3), 20-4 (A4), and 20-8 (A8) as components that originated the logfile records 24-A1, 24-A2, 24-B1, and 24-B2 during the time window W1.

The dependency generator 36 identifies the time window W2 as covering a different five second time span than that of the time window W1, such as the time span from 0:00:05 to 0:00:10. The dependency generator 36, based on the logfile records 24-A3, 24-A4, 24-A5, and 24-B3 in the logfiles 25-A and 25-B, generates a time window record 54-2 which identifies the components 20-3 (A3), 20-6 (A6), 20-8 (A8), and 20-4(A4) as components that originated the logfile records 24-A3, 24-A4, 24-A5, and 24-B3 during the time window W2.

Similarly, the dependency generator 36 generates time window records 54-3-54-5 based on the logfile records 24-A and 24-B in the time windows W3-W5 in the logfiles 25-A and 25-B. In this example, the dependency generator 36 generates a Bayesian network 56 based on the plurality of time window records 54-1-54-5. The Bayesian network 56 includes a directed acyclic graph (DAG) 58. The DAG 58 comprises a plurality of nodes, each node of the plurality of nodes corresponding to a particular component 20, and edges between pairs of nodes, the edges identifying a direction from a parent node of the pair of nodes to a child node of the pair of nodes, and information 61 that identifies a probability of the occurrence of a logfile record 24 originated by the component 20 that corresponds to the child node given that a logfile record 24 of the component 20 corresponding to the parent node exists.

In one example, the dependency generator 36 generates the Bayesian network 56 by utilizing a Bayesian network generator 60, such as may be provided by a Bayesian network generating package, such as, by way of non-limiting example, the BNlearn Bayesian network generating package, available at www.bnlearn.com. However, the examples herein can utilize any Bayesian network generator.

Figure 4:
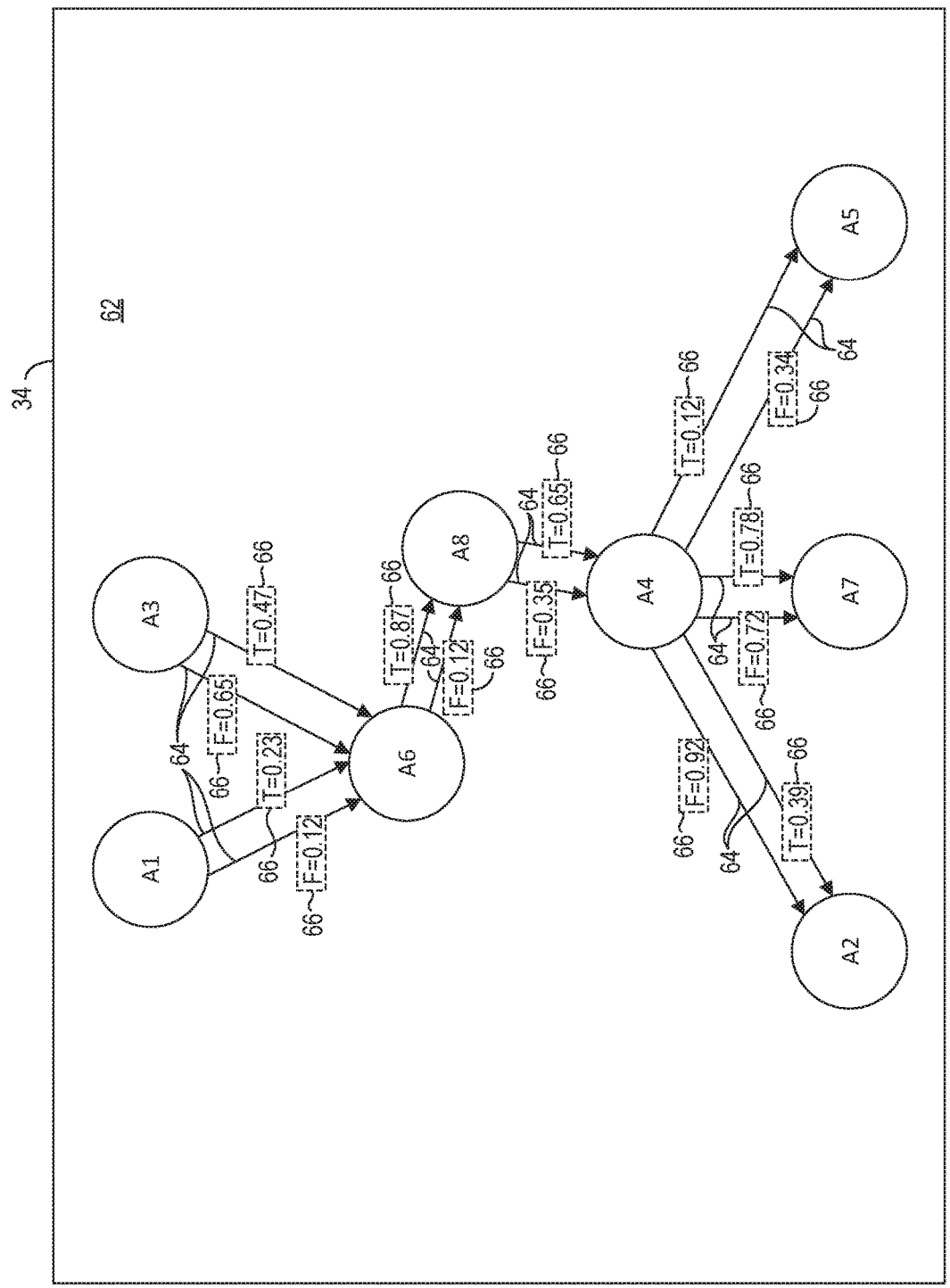
FIG. 4 is a block diagram illustrating a visualization of a directed acyclic graph depicted on a display device according to one example.

FIG. 4 is a block diagram illustrating a visualization of the directed acyclic graph 58 that is depicted on the display device 34 according to one example. The dependency generator 36 generates an image 62 based on the directed acyclic graph 58 that identifies each component 20, dependencies between components 20 via lines 64 that connect pairs of components 20, and probabilities 66 associated with pairs of components 20. The probabilities 66 may identify a probability that a logfile record originating from a child component will exist given that a logfile record of a parent component exists (identified in the image 62 via the letter "T"), and/or a probability that a logfile record originating from a child component will exist given that a logfile record of a parent component does not exist (identified in the image 62 via the letter "F").

Figure 5:
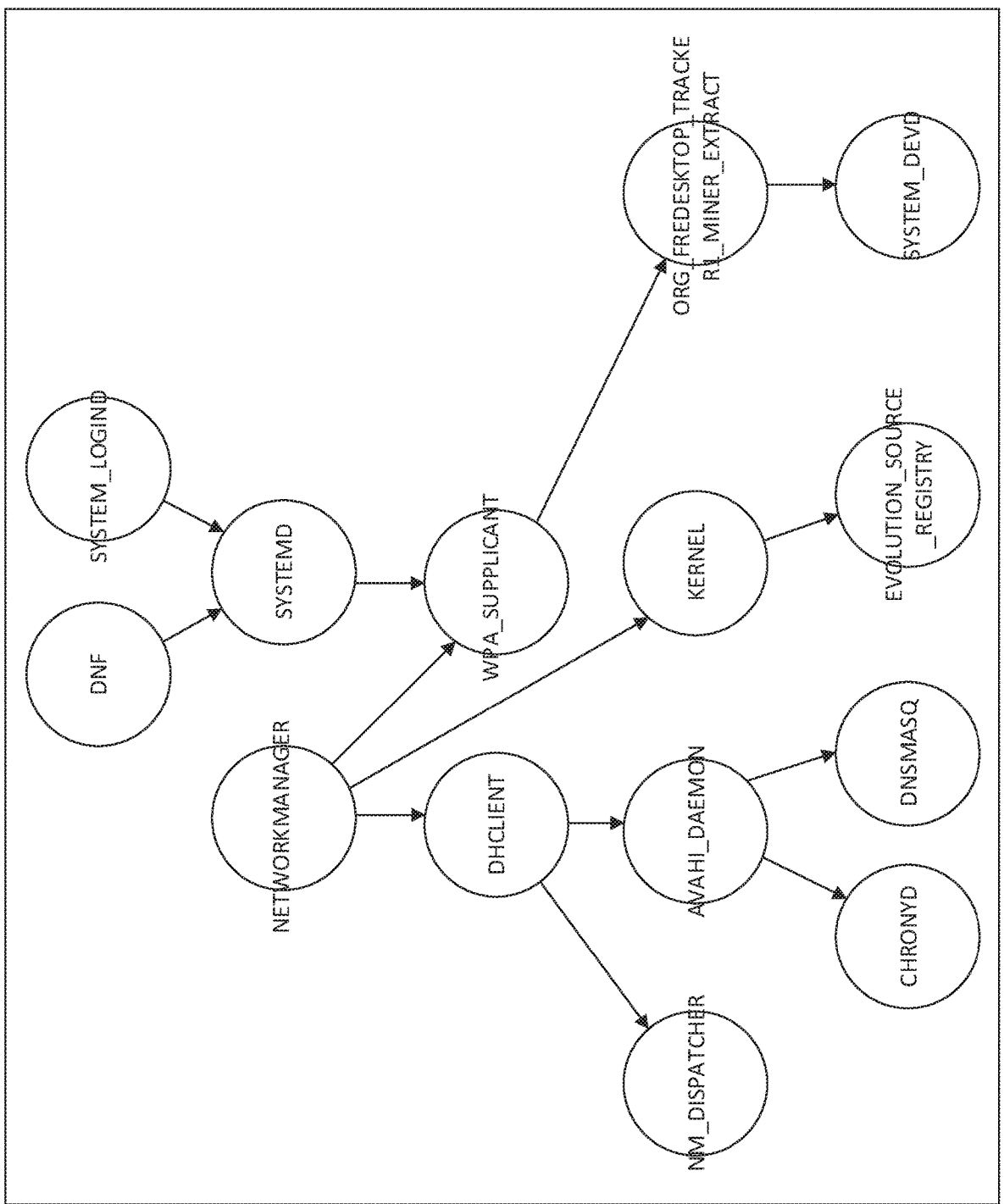
FIG. 5 is a block diagram illustrating another example of a directed acyclic graph depicted on the display device generated based on logfile records from a logfile contained on a desktop computer running a Linux operating system, according to one example.

FIG. 5 is a block diagram illustrating another example of a directed acyclic graph depicted on the display device 34 generated based on logfile records from a logfile contained on a desktop computer running a Linux operating system, according to one example.

Figure 6:
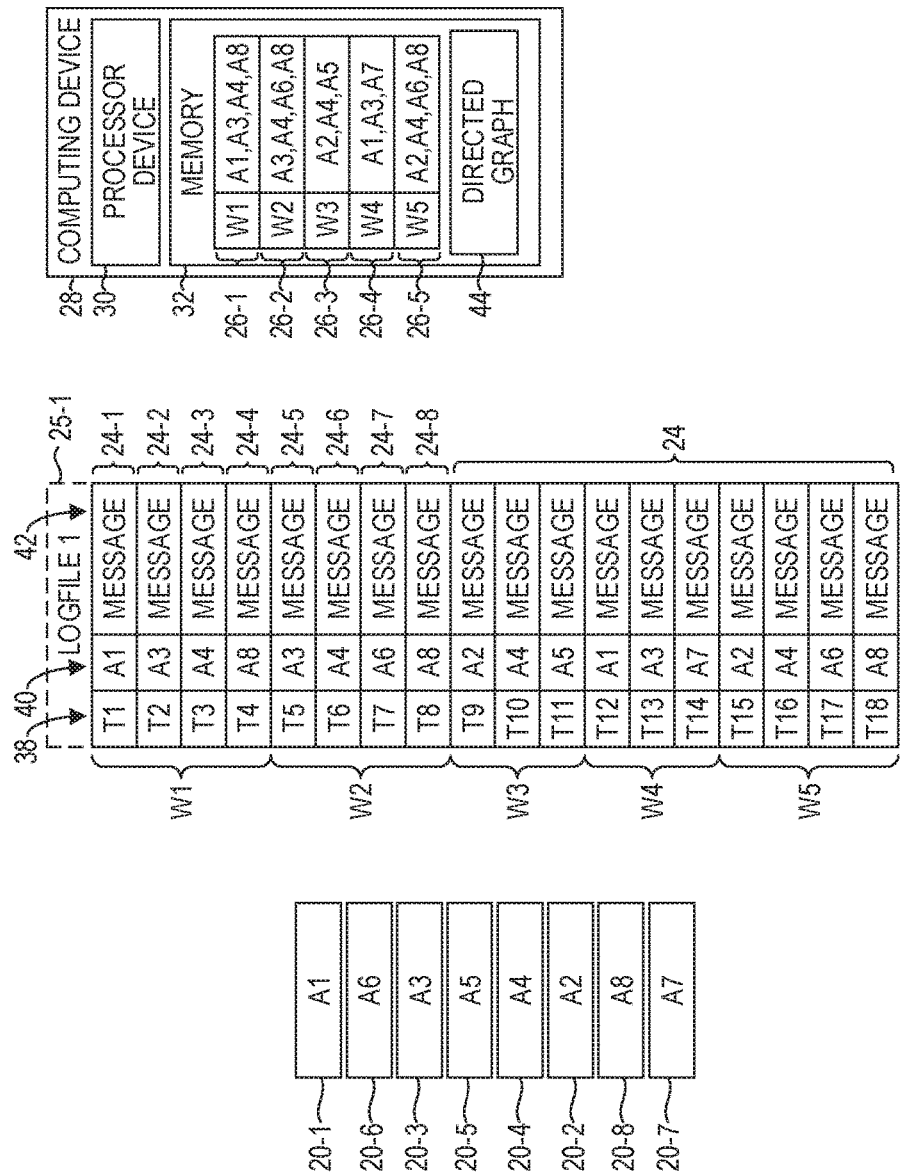
FIG. 6 is a simplified block diagram of the environment illustrated in FIG. 1 according to one example.

FIG. 6 is a simplified block diagram of the environment 10 illustrated in FIG. 1 according to one example. The environment 10 includes the computing device 28 which has the memory 32 and the processor device 30 coupled to the memory 32. The processor device 30 is to access the logfile 25-1 comprising the plurality of logfile records 24 that were originated by the plurality of components 20, at least some of the plurality of logfile records 24 identifying a time associated with the logfile record 24 and a component 20 of the plurality of components 20 that originated the logfile record 24. The processor device 30 is further to parse each respective logfile record 24 of the at least some of the plurality of logfile records 24 to identify the time associated with the logfile record 24 and the component 20 that originated the logfile record 24. The processor device 30 is further to generate, based on the at least some of the plurality of logfile records 24, the plurality of respective time window records 26, each respective time window record 26 identifying the components 20 that originated the logfile records 24 during a time window W1-W5 that corresponds to the respective time window record 26. The processor device 30 is further to generate, based on the plurality of time window records 26, a directed graph 44 that identifies dependencies among the plurality of components 20.

Figure 7:
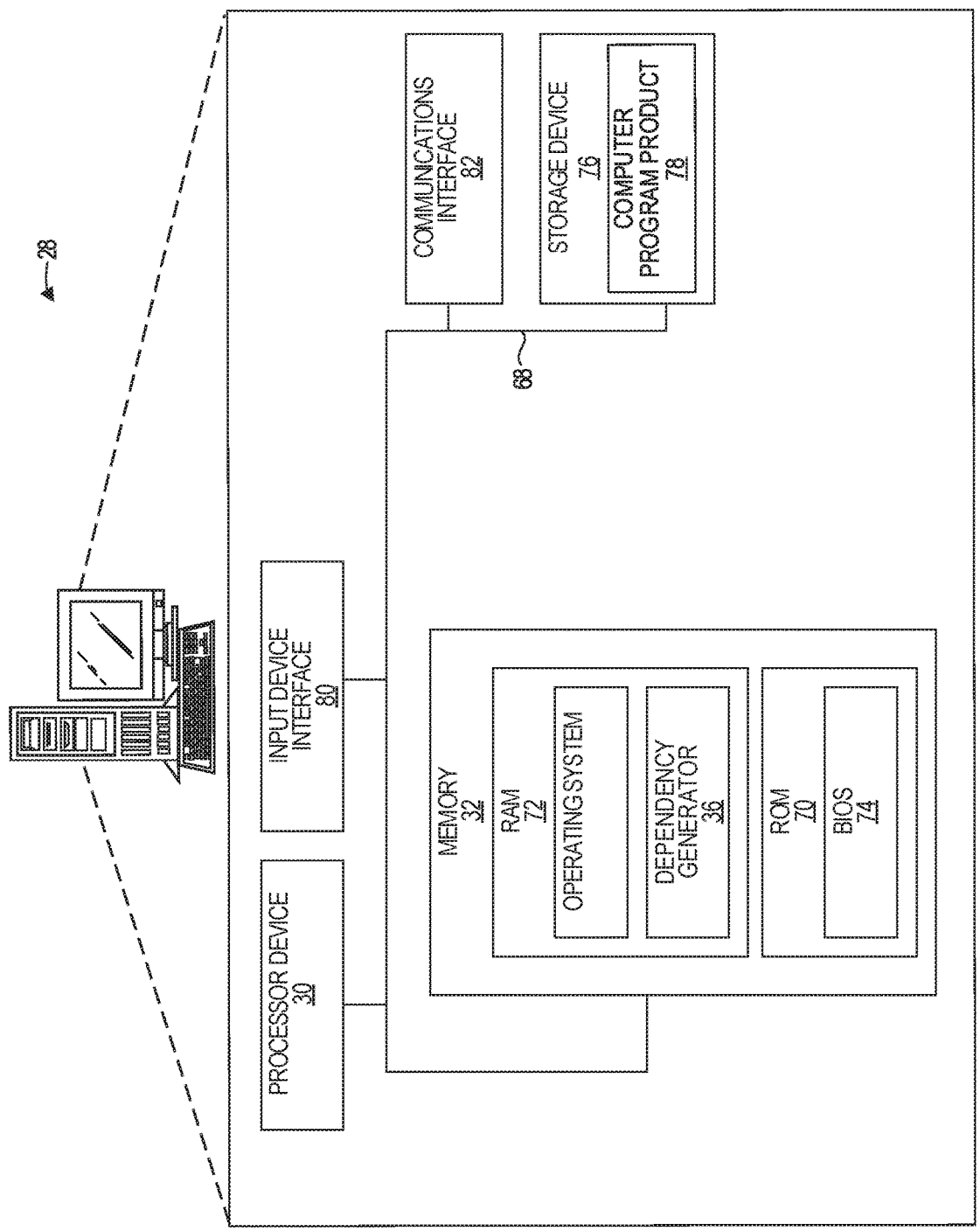
FIG. 7 is a block diagram of a computing device suitable for implementing the disclosed examples.

FIG. 7 is a block diagram of the computing device 28 suitable for implementing examples according to one example. The computing device 28 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 28 includes the processor device 30, the memory 32, and a system bus 68. The system bus 68 provides an interface for system components including, but not limited to, the memory 32 and the processor device 30. The processor device 30 can be any commercially available or proprietary processor.

The system bus 68 may be any of several types of bus structures that may further interconnect to a memory bus (with or without a memory controller), a peripheral bus, and/or a local bus using any of a variety of commercially available bus architectures. The memory 32 may include non-volatile memory 70 (e.g., read-only memory (ROM), erasable programmable read-only memory (EPROM), electrically erasable programmable read-only memory (EEPROM), etc.), and volatile memory 72 (e.g., random-access memory (RAM)). A basic input/output system (BIOS) 74 may be stored in the non-volatile memory 70 and can include the basic routines that help to transfer information between elements within the computing device 28. The volatile memory 72 may also include a high-speed RAM, such as static RAM, for caching data.

The computing device 28 may further include or be coupled to a non-transitory computer-readable storage medium such as a storage device 76, which may comprise, for example, an internal or external hard disk drive (HDD)

(e.g., enhanced integrated drive electronics (EIDE) or serial advanced technology attachment (SATA)), HDD (e.g., EIDE or SATA) for storage, flash memory, or the like. The storage device 76 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 76 and in the volatile memory 72, including an operating system and one or more program modules, such as the dependency generator 36, which may implement the functionality described herein in whole or in part.

All or a portion of the examples may be implemented as a computer program product 78 stored on a transitory or non-transitory computer-usable or computer-readable storage medium, such as the storage device 76, which includes complex programming instructions, such as complex computer-readable program code, to cause the processor device 30 to carry out the steps described herein. Thus, the computer-readable program code can comprise software instructions for implementing the functionality of the examples described herein when executed on the processor device 30. The processor device 30, in conjunction with the dependency generator 36 in the volatile memory 72, may serve as a controller, or control system, for the computing device 28 that is to implement the functionality described herein.

An operator, such as the user 22, may also be able to enter one or more configuration commands through a keyboard (not illustrated), a pointing device such as a mouse (not illustrated), or a touch-sensitive surface such as the display device 34. Such input devices may be connected to the processor device 30 through an input device interface 80 that is coupled to the system bus 68 but can be connected by other interfaces such as a parallel port, an Institute of Electrical and Electronic Engineers (IEEE) 1394 serial port, a Universal Serial Bus (USB) port, an IR interface, and the like.

The computing device 28 may also include a communications interface 82 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    accessing, by a computing device comprising a processor device, a logfile comprising a plurality of logfile records that were originated by a plurality of components, at least some of the plurality of logfile records identifying a time associated with the logfile record and a component of the plurality of components that originated the logfile record;
    parsing each respective logfile record of the at least some of the plurality of logfile records to identify the time associated with the logfile record and the component that originated the logfile record;
    generating, based on the at least some of the plurality of logfile records, a plurality of respective time window records, each respective time window record identifying the components that originated the logfile records during a time window that corresponds to the respective time window record; and
    generating, based on the plurality of time window records, a directed graph that identifies dependencies among the plurality of components.

2. The method of claim 1 further comprising outputting the directed graph for presentation.

3. The method of claim 2 wherein outputting the directed graph for presentation comprises outputting on a display device an image that identifies each component and that identifies the dependencies among the plurality of components via lines that connect pairs of components.

4. The method of claim 1 wherein accessing the logfile comprising the plurality of logfile records further comprises accessing a plurality of different logfiles that contain corresponding pluralities of logfile records; and
    wherein generating, based on the plurality of logfile records, the plurality of respective time window records further comprises generating, based on the plurality of logfile records in the plurality of logfiles, the plurality of respective time window records.

5. The method of claim 4 wherein each logfile of the plurality of different logfiles includes logfile records generated within a same timeframe.

6. The method of claim 1 wherein generating the directed graph that identifies the dependencies among the plurality of components comprises generating a Bayesian network based on the plurality of time window records, the Bayesian network comprising a directed acyclic graph.

7. The method of claim 6 wherein the directed acyclic graph comprises:
    a plurality of nodes, each node of the plurality of nodes corresponding to a particular component of the plurality of components; and
    edges between pairs of nodes, the edges identifying a direction from a parent node of the pair of nodes to a child node of the pair of nodes, and information that identifies a probability of an occurrence of a logfile record originated by a component that corresponds to the child node given that a logfile record of a component corresponding to the parent node exists.

8. The method of claim 7 further comprising:
    generating an image based on the directed acyclic graph that identifies:
    each component;
    the dependencies among the plurality of components via lines that connect pairs of components; and
    the information that identifies the probability of the occurrence of the logfile record originated by the component that corresponds to the child node given that the logfile record of the component corresponding to the parent node exists; and
    effecting presentation of the image on a display device.

9. The method of claim 1 wherein the time window is in a range between one second and one minute.

10. The method of claim 1 wherein the time window is non-varying.

11. The method of claim 1 wherein the directed graph comprises:
    a plurality of nodes, each node of the plurality of nodes corresponding to a particular component of the plurality of components; and
    edges between pairs of nodes, the edges identifying a direction from a parent node of the pair of nodes to a child node of the pair of nodes.

12. A computing device, comprising:
a memory; and
a processor device coupled to the memory to:
- access a logfile comprising a plurality of logfile records that were originated by a plurality of components, at least some of the plurality of logfile records identifying a time associated with the logfile record and a component of the plurality of components that originated the logfile record;
- parse each respective logfile record of the at least some of the plurality of logfile records to identify the time associated with the logfile record and the component that originated the logfile record;
- generate, based on the at least some of the plurality of logfile records, a plurality of respective time window records, each respective time window record identifying the components that originated the logfile records during a time window that corresponds to the respective time window record; and
- generate, based on the plurality of time window records, a directed graph that identifies dependencies among the plurality of components.

13. The computing device of claim 12 wherein to access the logfile comprising the plurality of logfile records, the processor device is further to access a plurality of different logfiles that contain corresponding pluralities of logfile records; and
wherein to generate, based on the plurality of logfile records, the plurality of respective time window records, the processor device is further to generate, based on the plurality of logfile records in the plurality of logfiles, the plurality of respective time window records.

14. The computing device of claim 12 wherein to generate the directed graph that identifies the dependencies among the plurality of components, the processor device is further to generate a Bayesian network based on the plurality of time window records, the Bayesian network comprising a directed acyclic graph.

15. The computing device of claim 14 wherein the directed acyclic graph comprises:
a plurality of nodes, each node of the plurality of nodes corresponding to a particular component of the plurality of components; and
edges between pairs of nodes, the edges identifying a direction from a parent node of the pair of nodes to a child node of the pair of nodes, and information that identifies a probability of an occurrence of a logfile record originated by a component that corresponds to the child node given that a logfile record of a component corresponding to the parent node exists.

16. The computing device of claim 15 wherein the processor device is further to:
generate an image based on the directed acyclic graph that identifies:
each component;
the dependencies among the plurality of components via lines that connect pairs of components; and
the information that identifies the probability of the occurrence of the logfile record originated by the component that corresponds to the child node given that the logfile record of the component corresponding to the parent node exists; and
effecting presentation of the image on a display device.

17. A computer program product stored on a non-transitory computer-readable storage medium and including instructions configured to cause a processor device to:
- access a logfile comprising a plurality of logfile records that were originated by a plurality of components, at least some of the plurality of logfile records identifying a time associated with the logfile record and a component of the plurality of components that originated the logfile record;
- parse each respective logfile record of the at least some of the plurality of logfile records to identify the time associated with the logfile record and the component that originated the logfile record;
- generate, based on the at least some of the plurality of logfile records, a plurality of respective time window records, each respective time window record identifying the components that originated the logfile records during a time window that corresponds to the respective time window record; and
- generate, based on the plurality of time window records, a directed graph that identifies dependencies among the plurality of components.

18. The computer program product of claim 17 wherein to access the logfile comprising the plurality of logfile records, the instructions further cause the processor device to access a plurality of different logfiles that contain corresponding pluralities of logfile records; and
wherein to generate, based on the plurality of logfile records, the plurality of respective time window records, the instructions further cause the processor device to generate, based on the plurality of logfile records in the plurality of logfiles, the plurality of respective time window records.

19. The computer program product of claim 17 wherein to generate the directed graph that identifies the dependencies among the plurality of components, the instructions further cause the processor device to generate a Bayesian network based on the plurality of time window records, the Bayesian network comprising a directed acyclic graph.

20. The computer program product of claim 19 wherein the directed acyclic graph comprises:
a plurality of nodes, each node of the plurality of nodes corresponding to a particular component of the plurality of components; and
edges between pairs of nodes, the edges identifying a direction from a parent node of the pair of nodes to a child node of the pair of nodes, and information that identifies a probability of an occurrence of a logfile record originated by a component that corresponds to the child node given that a logfile record of a component corresponding to the parent node exists.

21. The computer program product of claim 20 wherein the instructions further cause the processor device to:
generate an image based on the directed acyclic graph that identifies:
each component;
the dependencies among the plurality of components via lines that connect pairs of components; and
the information that identifies the probability of the occurrence of the logfile record originated by the component that corresponds to the child node given that the logfile record of the component corresponding to the parent node exists; and
effecting presentation of the image on a display device.

* * * * *